(12) United States Patent
Sugino et al.

(10) Patent No.: US 7,360,051 B2
(45) Date of Patent: Apr. 15, 2008

(54) STORAGE APPARATUS AND METHOD FOR RELOCATING VOLUMES THEREOF

(75) Inventors: Shoji Sugino, Odawara (JP); Haruaki Watanabe, Isehara (JP); Yoshihito Nakagawa, Ooi (JP)

(73) Assignee: Hitachi, Ltd., Tokyo (JP)

( * ) Notice: Subject to any disclaimer, the term of this patent is extended or adjusted under 35 U.S.C. 154(b) by 382 days.

(21) Appl. No.: 10/982,912

(22) Filed: Nov. 8, 2004

(65) Prior Publication Data

US 2006/0059301 A1 Mar. 16, 2006

(30) Foreign Application Priority Data

Sep. 10, 2004 (JP) .............................. 2004-263969

(51) Int. Cl.
G06F 12/00 (2006.01)
G06F 13/00 (2006.01)
G06F 13/28 (2006.01)

(52) U.S. Cl. ............................ 711/170; 711/1; 711/100; 711/161

(58) Field of Classification Search ...................... None
See application file for complete search history.

(56) References Cited

U.S. PATENT DOCUMENTS 6,061,761 A 5/2000 Bachmat 6,275,898 B1* 8/2001 DeKoning .................. 711/114
2003/0074528 A1* 4/2003 Soejima et al. ............. 711/114
2003/0204597 A1* 10/2003 Arakawa et al. ............ 709/226

FOREIGN PATENT DOCUMENTS

| EP | 1 158 395 A2 | 9/2000 |
| EP | 1 357 476 A2 | 4/2003 |
| JP | 2001-067187 | 8/1999 |

\* cited by examiner

*Primary Examiner*—Hyung S. Sough
*Assistant Examiner*—Gary W Cygiel
(74) *Attorney, Agent, or Firm*—Reed Smith LLP; Stanley P. Fisher, Esq.; Juan Carlos A. Marquez, Esq.

(57) ABSTRACT

A storage apparatus is capable of relocating volumes accurately even when a plurality of storage apparatuses are connected. The storage apparatus comprises an external connection function for recognizing an external logical volume set on a physical storage device as a logical volume inside the storage apparatus, a storage control device with a volume relocation function for relocating the logical volumes based on set conditions, and a storage unit with a plurality of physical storage devices. When the host sends a read request to the logical volume set on the physical storage device of the storage unit, the volume relocation function generates internally the same read request to the external storage volume set on the physical storage device in the external storage apparatus and relocates volumes based on the monitor information obtained by monitoring responses to the read request.

17 Claims, 7 Drawing Sheets

STORAGE APPARATUS AND METHOD FOR RELOCATING VOLUMES THEREOF

CROSS-REFERENCE TO RELATED APPLICATION

The present application claims priority from Japanese Patent Application No. JP 2004-263969 filed on Sep. 10, 2004, the content of which is hereby incorporated by reference into this application.

TECHNICAL FIELD OF THE INVENTION

The present invention relates to a storage apparatus, and in particular, to an effective technique applicable to a volume relocation between a plurality of storage apparatuses connected.

BACKGROUND OF THE INVENTION

Hitherto, an access time has been actually measured to check how frequently access is occurred in each logical volume of a plurality of logical volumes formed in a storage apparatus with a plurality of physical disks to relocate logical volumes while paying attention to concentration of access to a physical disk of which a logical disk is made (For example, Japanese Patent Application Laid-Open Publication No. 2001-67187).

SUMMARY OF THE INVENTION

However a conventional method for relocating volumes has intended to be applied for a single chassis storage apparatus. When a plurality of storage apparatuses are connected to one another, the conventional method cannot occasionally match with configuration of, for instance, other manufacturer's storage apparatuses, and with processing. A problem lies in that the conventional method of relocating volumes has not accurately determined access concentration to volumes of other storage apparatuses.

The purpose of the present invention is to provide a storage apparatus capable of relocating volumes accurately even with a plurality of storage apparatuses connected.

In the following is briefly described a brief outline of typical inventions out of those disclosed in this application.

A storage apparatus according to the present invention has a storage control device and a storage unit comprised of a plurality of physical storage devices. The storage control device comprises a control section for communicating with a host apparatus and the storage unit, a cache memory for storing temporarily data transferred between the host apparatus and the storage unit, a shared memory in which control information communicated by the control section is stored, an external connection function for recognizing an logical volume of the external storage unit set on the physical storage device in an external storage apparatus connected outside the chassis of the storage apparatus as a logical volume inside the storage apparatus, and a volume relocation function of relocating the logical volume based on a set condition. The volume relocation function measures an occupied time of I/O to the logical volume in the external storage unit and an occupied time of I/O to the logical volume in the storage apparatus, and relocates the logical volumes based On the measurements.

Further, a storage apparatus according to the present invention has a storage control device and a storage unit comprised of a plurality of physical storage devices. The storage control device comprises a control section for communicating with the host apparatus and the storage unit, a cache memory for storing temporarily data transferred between the host apparatus and the storage unit, a shared memory in which control information communicated by the control section is stored, an external connection function for recognizing a external logical volume set on the physical storage device in the external storage apparatus connected outside the chassis of the storage apparatus as a logical volume inside the storage apparatus, and a volume relocation function of relocating the logical volumes based on a set condition. When the host apparatus sends a read request to the logical volume set on the physical storage device of the storage unit, the volume relocation function generates internally the same read request to the external storage volume set on the physical storage device of the external storage apparatus and relocates volumes based on the monitor information obtained by monitoring responses to the read request.

Still further, a storage apparatus according to the present invention has a storage control device and a storage unit comprised of a plurality of physical storage devices. The storage control device comprises a data transfer control section for controlling data transfer between a host apparatus and itself and between the storage unit and itself, a cache memory for storing temporarily the data, a shared memory in which configuration information of the storage apparatus is stored, and an external connection function for defining a logical volume of the external storage unit set on the physical storage device in the external storage apparatus connected outside the chassis of the storage apparatus as a logical volume formed on the physical storage device in the storage apparatus. The storage control device issues a read request to the logical volume of the external storage apparatus to measure the process time.

In a method for relocating volumes of a storage apparatus, the storage apparatus comprises a storage control device having a plurality of channel control processors for controlling data transfer between a host apparatus and itself, a disk control processor for controlling data transfer between a storage unit and itself, a cache memory for storing temporarily data, a shared memory in which configuration information of the storage apparatus is stored, and an external connection function for defining a logical volume of the external storage unit set on the physical storage device in an external storage apparatus connected outside the chassis of the storage apparatus as a logical volume formed on the physical storage device in the storage apparatus, and a storage unit comprised of a plurality of physical storage devices. The method comprises the steps of generating internally the same read request to the logical volumes of the external storage apparatus when the host apparatus sends a read request to the logical volume set on the physical storage device of the storage unit, issuing a read request to the logical volumes of the external storage unit, measuring an occupied time of I/O by the read request to the logical volume in the external storage unit and an occupied time of I/O by the read request to the logical volume in the storage apparatus, and relocating the logical volumes based on the measurements.

BRIEF DESCRIPTIONS OF THE DRAWINGS

Figure 6:
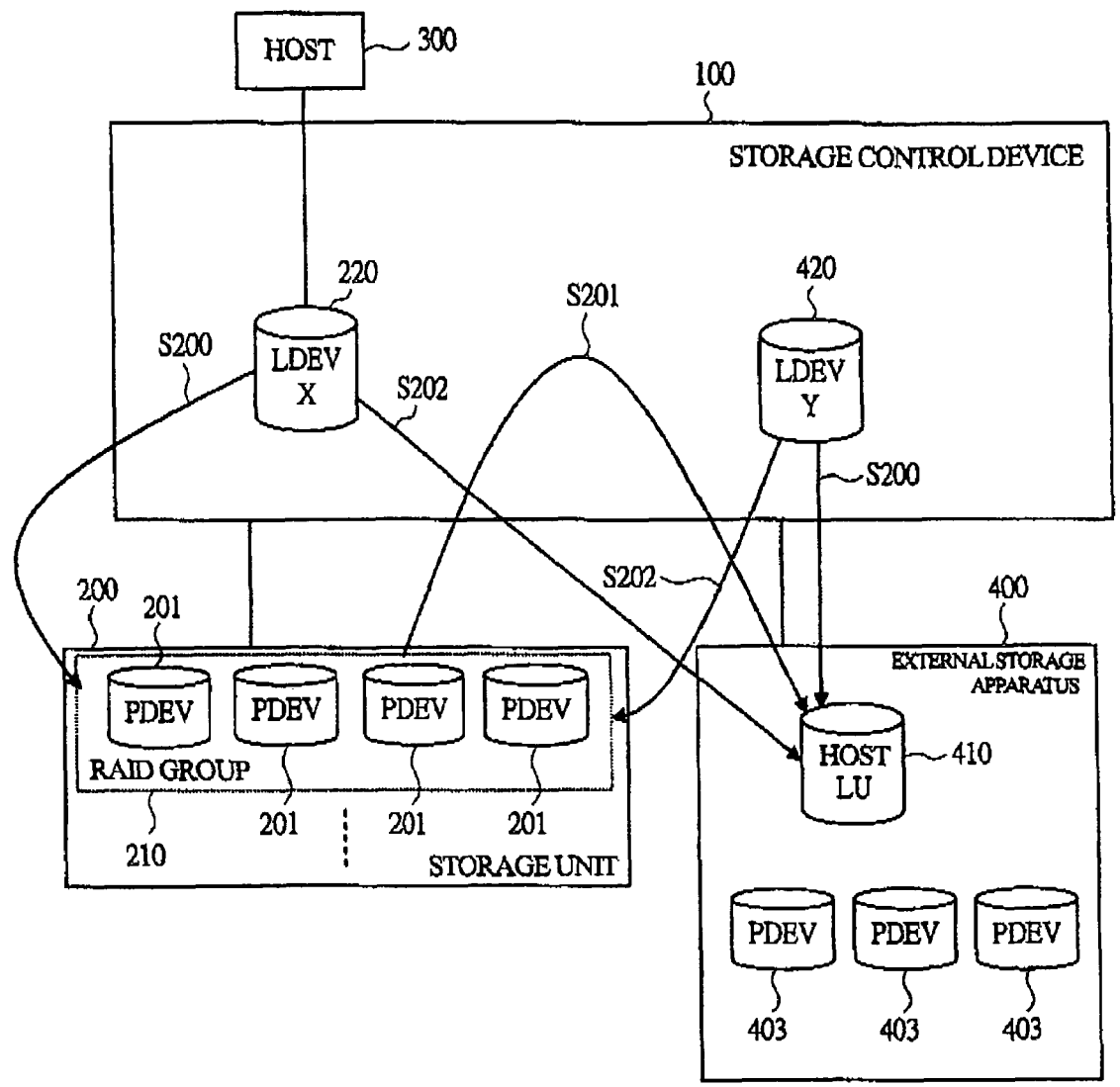
Figure 7:
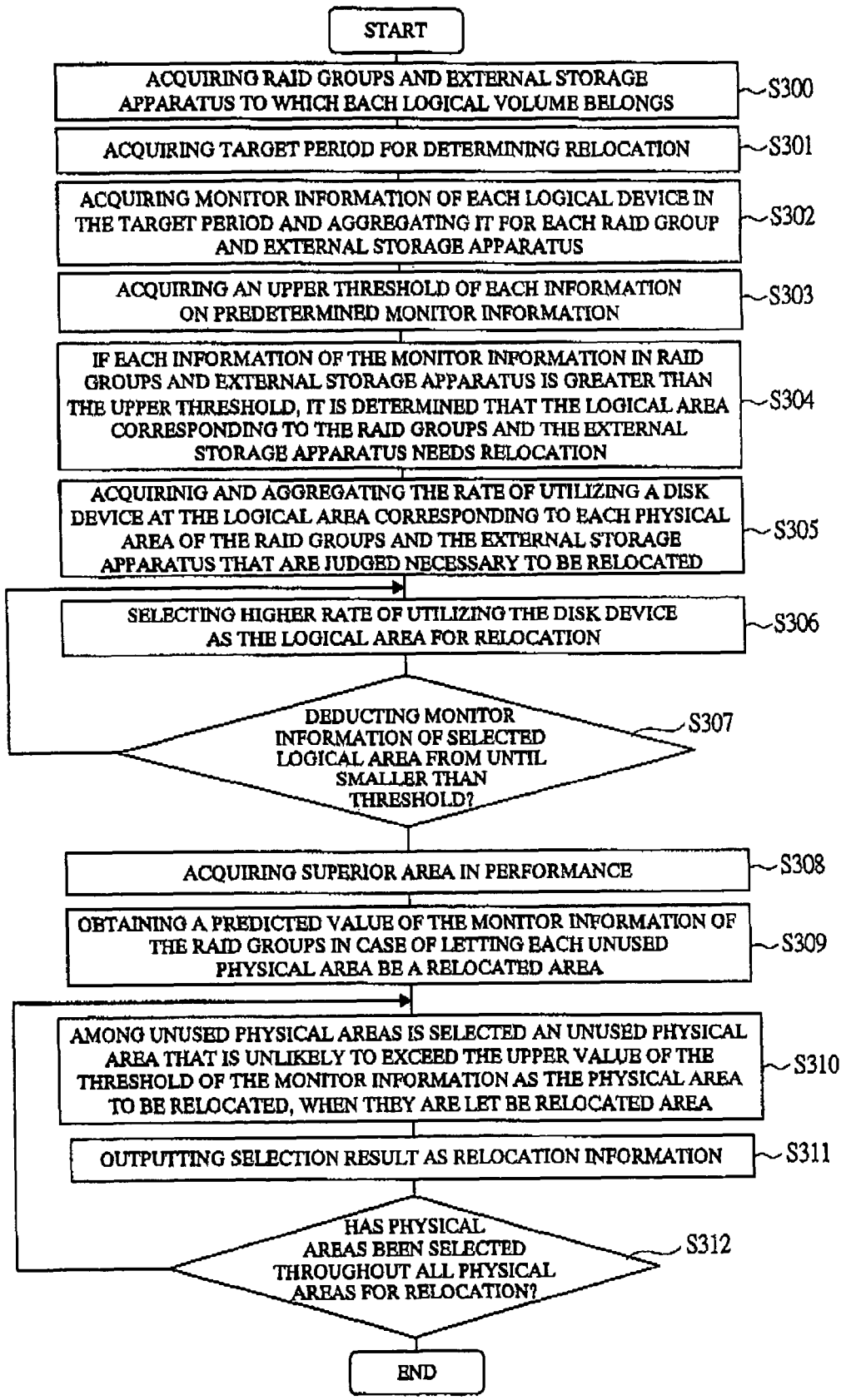

FIG. 6 is a diagram for describing the operation of volume relocation between a logical device before relocated and a candidate logical device after relocated in a storage apparatus related to a second embodiment of the present invention; and FIG. 7 is a flow chart showing the operation of determination to relocate volumes in a storage apparatus related to a second embodiment of the present invention.

DESCRIPTION OF THE PREFERRED EMBODIMENTS

Below is described in detail the embodiment of the present invention based on the drawings. Same references denote corresponding features consistently throughout the attached drawings, so that explanation is not repeated.

First Embodiment

Figure 1:
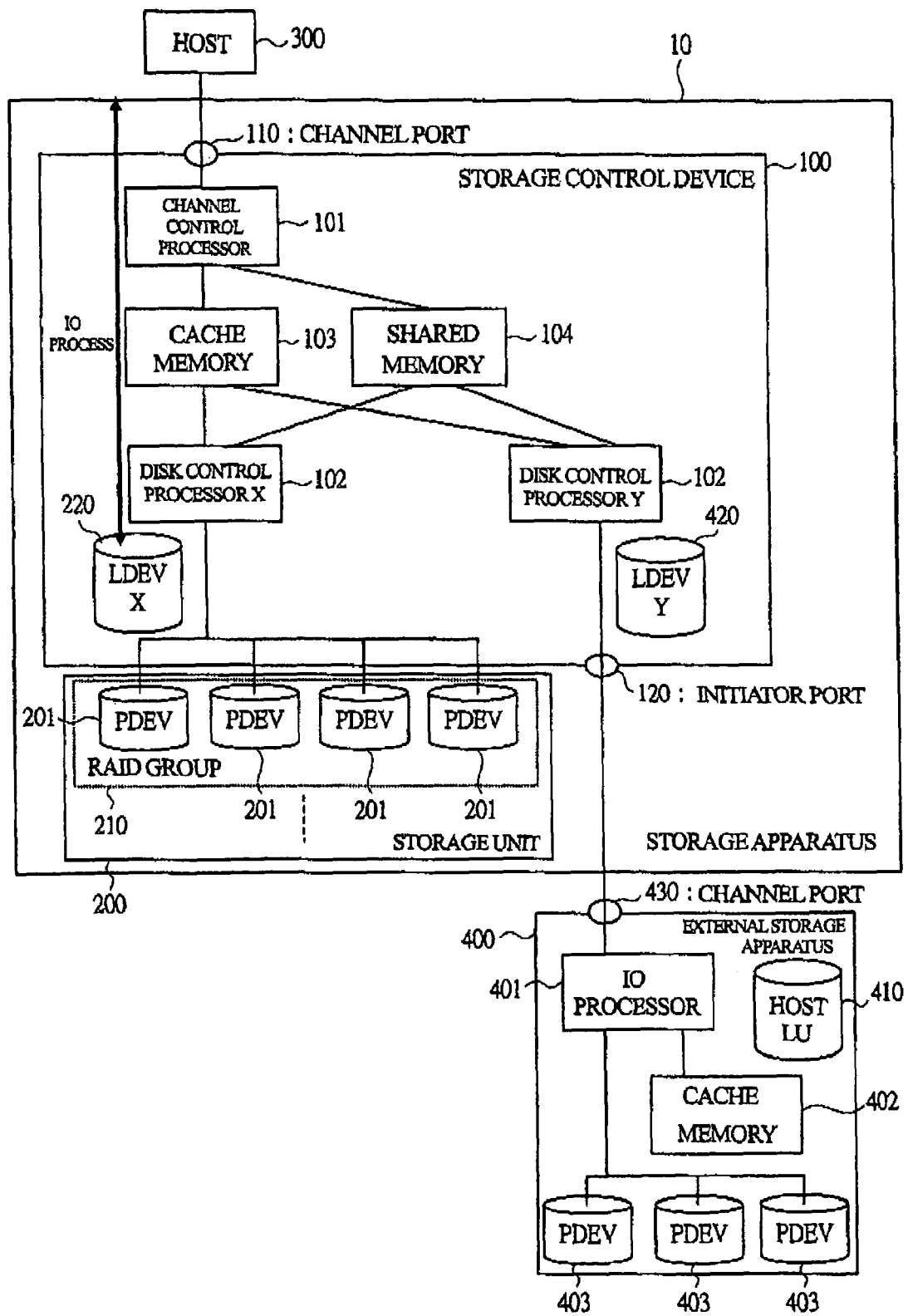
FIG. 1 is a block diagram illustrating the configuration of a storage apparatus related to a first embodiment of the present invention.

In FIG. 1 is described the configuration of a storage apparatus related to the first embodiment of the present invention. FIG. 1 is a block diagram illustrating the configuration of the storage apparatus related to the first embodiment of the present invention.

In FIG. 1, the storage apparatus 10 is comprised of a storage control device 100 and a storage unit 200.

The storage control device 100 is comprised of a channel control processor 101, a disk control processor 102, a cache memory 103, and a shared memory 104.

The channel control processor 101 having a communication interface for communicating with a host (host apparatus) 300 via a channel port 110, by which data input-output commands are transferred between the host 300 and the channel control processor 101.

The disk control processor 102 is communicably connected to a plurality of physical storage devices 201 for storing data, and controls the storage unit 200. The disk control processor 102 is connected to an external storage apparatus 400 via an initiator port 120, controlling also the external storage apparatus 400.

The cache memory 103 temporarily stores data exchanged among the host 300, the storage unit 200 and the external storage apparatus 400.

The shared memory 104 stores controlling information and monitoring information exchanged between the channel control processor 101 and the disk control processor 102.

The storage unit 200 is equipped with a plurality of physical storage devices 201, thereby providing a large capacity storage area for the host 300, In the storage unit 200, Redundant Arrays of Inexpensive Disks (RAID) are formed by a plurality of the physical storage devices 201, and the storage unit 200 has a plurality of the RAID groups 210.

On the RAID groups 210 may be set a logical volume that is a logical storage area. Mapping the logical volume on the RAID groups 210 by the storage control device 100 provides the host 300 with a storage area as a logical device (LDEV X) 220.

The external storage apparatus 400 is comprised of an IO processor 401, a cache memory 402, and a plurality of physical storage devices 403.

The IO processor 401 is equipped with a communication interface for communicating with the storage apparatus 10 via a channel port 430, whereby to exchange data input-output commands between the storage apparatus 10 and the IO processor 401. Further, the IO processor 401 is communicably connected to the physical storage devices 403, and controls the physical storage devices 201.

The cache memory 402 temporarily stores data exchanged between the storage apparatus 10 and the physical storage devices 403.

Being plural, the physical storage devices 403 can provide a large capacity storage area. On the physical storage device 403 can be set a logical volume (host LU) 410 that is a logical storage area. Mapping the logical volume 410 of the external storage apparatus by the storage control device 100 provides the host 300 with a storage area as a logical device (LDEV Y) 420. The logical device (LDEV Y) 420 can be handled as is the case with the logical device (LDEV X) 220 in the storage apparatus 10, so that both storage areas in the storage apparatus 10 and in the external storage apparatus 400 can be handled without discrimination.

The external storage apparatus 400 is not only connected to the storage apparatus 10, but also used as a common storage apparatus, in that case, the host 300 is connected to the IO processor 401. A plurality of the physical storage devices 201 provides the host 300 with a storage area.

<External Connection Function>

Figure 2:
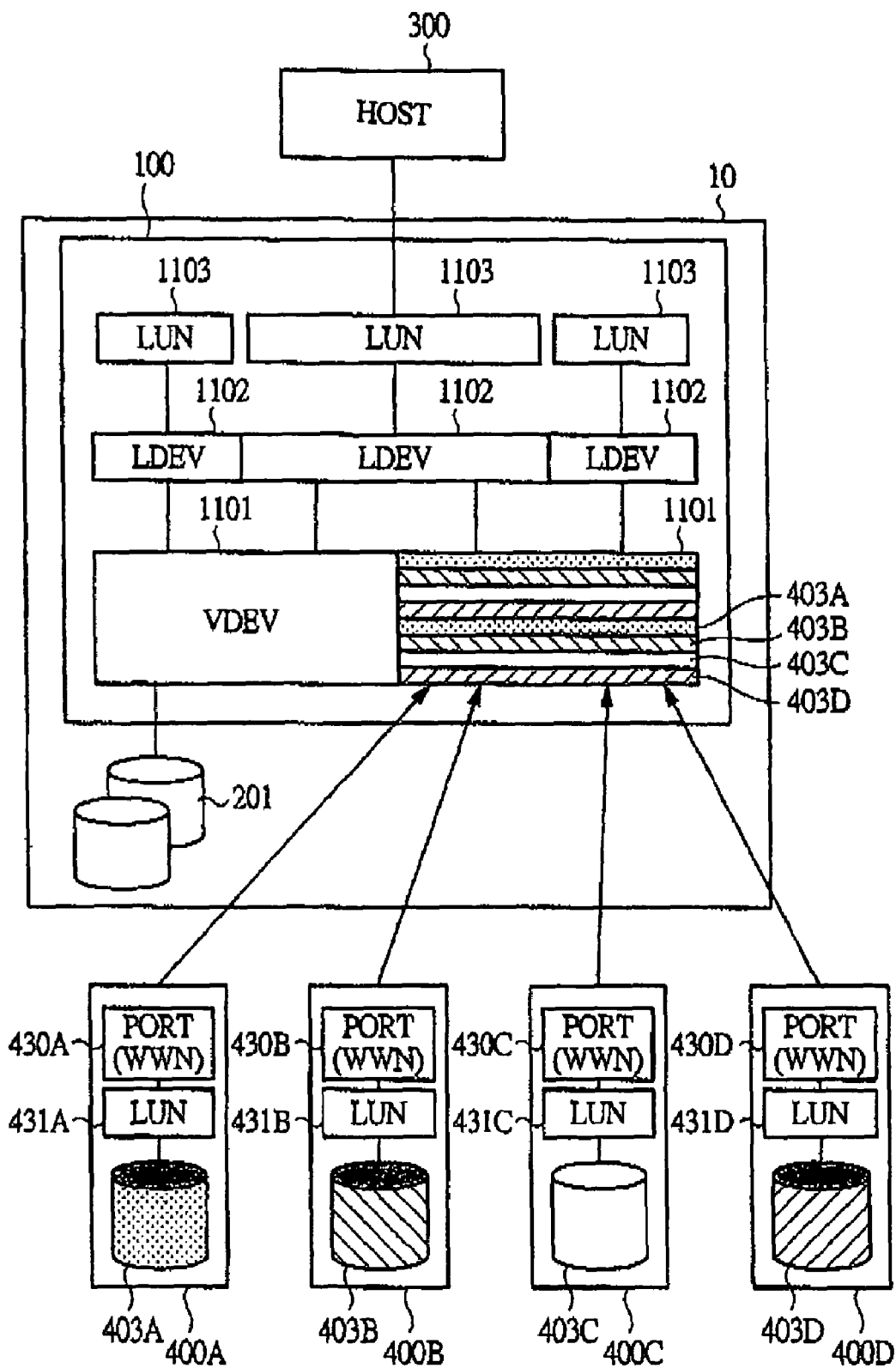
FIG. 2 is a schematic diagram for describing an external connection function in a storage apparatus related to a first embodiment of the present invention.

The external connection function in the storage apparatus related to the first embodiment of the present invention is described in detail with reference to FIG. 2. FIG. 2 is a schematic diagram for describing an external connection function in a storage apparatus related to a first embodiment of the present invention and illustrates one logic schematic configuration of the storage apparatus 10 and the external storage apparatus 400.

In FIG. 2, the storage control device 100 of the storage apparatus 10 has a three-layered storage hierarchy comprised of VDEV 1101, LDEV 1102, and LUN 1103, in the order from the lowest layer, For an explanation purpose, FIG. 2 also shows a configuration in which four external storage apparatuses 400 are connected.

The VDEV 1101 is a virtual device situated in the bottom of the logical storage hierarchy. The VDEV 1101 is such that physical storage resource is virtualized, to which the RAID configuration can be applied. That is, not only one physical storage device 201 can form a plurality of VDEVs 1101 (slicing), but a plurality of physical storage devices 201 can form one VDEV 1101 (striping). The VDEV 1101 shown in the left-hand side of FIG. 2, for instance, virtualizes the physical storage device 201 according to the predetermined RAID configuration.

On the other hand, the VDEV 1101 shown in the right-hand side of FIG. 2 is formed by mapping the physical storage device 403 of the external storage apparatus 400. Namely, in this embodiment the logical volume 410 provided by the physical storage device 403 of the external storage apparatus 400 can be used as an internal volume of the storage apparatus 10 by mapping it onto the VDEV 1101 using a mapping table and others.

FIG, 2 shows an example in which the VDEV 1101 is formed by striping the physical storage devices 403A to 403D of the four external storage apparatuses 400A to 400D. The physical storage devices 403A to 403D can be separately accessed by specifying respective LUNs 431A to 431D from the respective communication ports 430A to 430D in the IO processor 401. WWN that is unique identifying information is assigned to the communication ports 430A to 430D. At LUNs 431A to 431D are set LUN numbers, so that a physical storage device can be identified by combining WWN with LUN numbers.

The LDEV 1102 is provided over the VDEV 1101. The LDEV 1102 is a logical device (logical volume) in which a virtual device (VDEV) is virtualized. One VDEV 1101 may be connected to two LDEVs 1102, or a plurality of VDEVs 1101 may be connected to one LDEV 1102. The LDEVs 1102 can be accessed through their respective LUNs 1103.

In this embodiment, the physical storage device 403 of the external storage apparatus 400 can be thus used as one of the internal volumes in the storage apparatus 10 by connecting the physical storage device 403 to the intermediate storage hierarchies (VDEV 1101 and LDEV 1102) situated between the LUN 1103 and the physical storage device 403. That is, the internal and the external volume of the storage apparatus 10 can be equivalently handled.

<Volume Relocation Function>

The volume relocation function in the storage apparatus related to the first embodiment of the present invention is described with reference to FIGS. 3 and 4.

Figure 3:
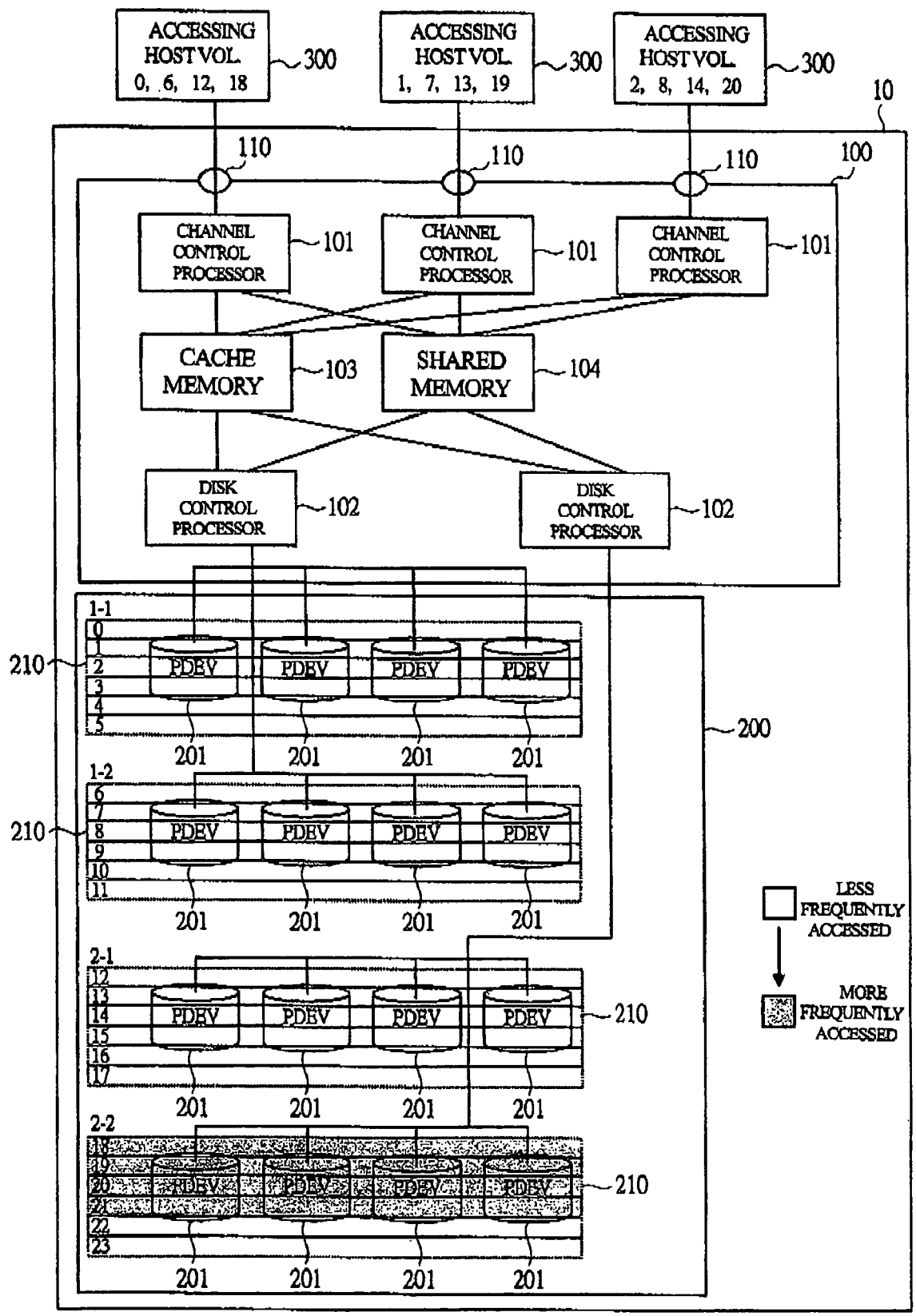
FIG. 3 is a diagram for describing a volume relocation function in a storage apparatus related to a first embodiment of the present invention.
Figure 4:
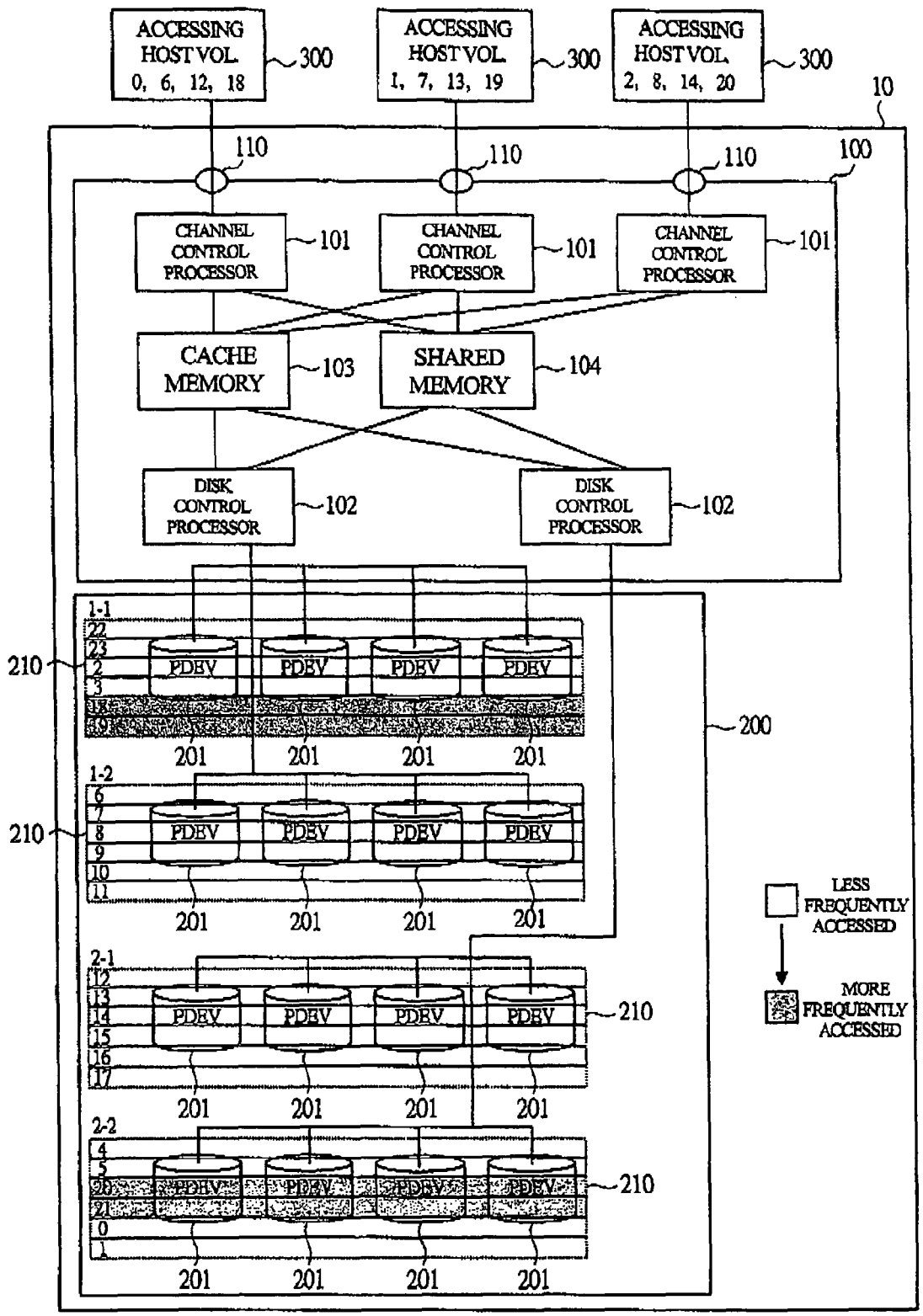
FIG. 4 is a diagram for describing a volume relocation function in a storage apparatus related to a first embodiment of the present invention.

FIGS. 3 and 4 is diagrams for describing a function of volume relocation in the storage apparatus related to the first embodiment of the present invention and illustrating schematically a relation between a logical volume in the storage apparatus and a physical disk array. For an explanation purpose, FIGS. 3 and 4 show an example of configuration only with the physical storage device 201 in the storage unit 200 of the storage apparatus 10.

In general, information equipment comprised of complex hardware such as a disk array apparatus is provided such that its users can use it without the consciousness of complex hardware configuration.

In FIGS. 3 and 4, the host 300 issues data reading and writing instructions to the storage apparatus 10.

In this case, the host 300 does not take into account where the instruction is stored in the physical storage device 201 actually provided in the storage apparatus 10. The host 300 assigns a logical storage area called a logical unit, and issues data reading and writing instructions to the logical area. Then, the storage apparatus 10 needs to manage where a logical unit specified by the host 300 lies on the physical storage device 201. Therefore, the storage apparatus 10 does the management using various tables about where the logical unit recognized by the host 300 corresponds on the physical storage device 201.

In the storage apparatus 10 shown in FIGS. 3 and 4, one RAID group 210 is formed with a combination of a plurality of physical storage devices 201. FIGS. 3 and 4 show a state in which four RAID groups 210; 1-1, 1-2, 2-1, and 2-2 are formed. For example, the RAID group 201 of 1-1 is divided into a plurality of the logical volumes 0, 1, 2, 3, 4 and 5 over the physical storage device 201. In the same way, other RAID groups 210 are divided into a plurality of the logical volumes.

In the RAID groups 201 are secured in advance the logical volumes (logical reserve volume) that are candidates for destination where volumes are relocated. In the examples shown in FIGS. 3 and 4, volumes 4, 5, 10, 11, 16, 17, 22, and 23 are reserve volumes in the RAID groups 210, which are not used by the host 300.

Where, a logical volume refers to a logical unit at which a storage unit manages a storage area. The storage apparatus 10 has information on which RAID group is disposed the logical volume, as one of various configuration information.

The association of the logical unit with the logical volume is managed, for example, with a microprocessor provided in the channel control processor 101 using a managing table. In other words, when a storage area is specified with a number given to the logical unit by the host 300, the microprocessor interprets that the number is associated with which logical volume with reference to the managing table, and specifies the logical volume for reading and writing data.

Thus, with the managing table and others the mapping of the logical volume is managed, and for the host 300 is provided a storage area. A destination to be accessed by the logical volume can be changed by modifying mapping through the change of the managing table.

The half-toned dotted areas in FIGS. 3 and 4 denote more frequently used logical volumes. FIG. 3 shows a state in which the more frequently used logical volumes concentrates in one RAID group 210 (2-2). When the more frequently used logical volumes concentrate in one volume, logical volumes belonging to the RAID group 210 compete with one another to access, resultantly lowering throughput. This is because it is physically impossible for the logical volumes in the same RAID group 210 to be accessed at the same time.

In such a case, it is desirable to move more frequently accessed logical volumes to the RAID group 210 constituted by comparatively less frequently accessed logical volumes in order to equalize the load. Specifically, it is preferable to move more frequently accessed logical volumes to the logical reserve volumes prepared in advance in respective RAID groups 210.

FIG. 4 shows a state in which more frequently used logical volumes are properly distributed to the RAID groups 210 constituted by relatively less frequently accessed logical volumes. As shown in FIG. 4, the relocation of the volumes by moving the logical volumes disperses the load from the host 300 to other RAID groups 210 constituted by different physical storage devices 201, resulting in improvement in the total throughput.

In this embodiment, the external storage apparatus 400 is so connected that it can be used as one of the internal volumes of the storage apparatus 10, therefore this volume relocation can also be applied as is the case with the internal volume in the storage apparatus 10.

<Detection of Access Concentration>

In the following is described the detection of access concentration related to the first embodiment of the present invention.

As shown in FIG. 1, in this embodiment the external storage apparatus 400 is connected outside so that the external volume of the external storage apparatus 400 can be treated as with the internal volume of the storage apparatus 10.

Access concentration is measured by considering to be equal an occupied time of I/O to the external volume of the external storage apparatus 400 and an occupied time of an access to the physical storage device 201 within the chassis of the storage apparatus 10.

Based upon the measurements of the access concentration, relocation of volumes including the logical volumes in the storage apparatus 10 and the external logical volumes of the external storage apparatus 400 is performed.

When there are application-prioritized volumes, they are handled as non-targeted volumes for relocation. They are excluded from the target for relocation on the measurement result of access result, and not relocated.

Thus, this embodiment measures an access concentration with an occupied time of I/O to the external volume of the external storage apparatus 400 and an occupied time of an access to the physical storage device 201 in the chassis of the storage apparatus 10 considered to be equal. This measurement, which is the same one as used in measuring the physical storage device 201 in the chassis of the storage apparatus 10, makes it possible to relocate volumes without distinction between the internal volume in the chassis of the storage apparatus 10 and the external volume of the external storage apparatus 400 connected outside.

Second Embodiment

The second embodiment is such that for the internal volume of the storage apparatus 10 and the external volume of the external storage apparatus 400 connected outside in the first embodiment, I/O is internally issued to measure its response time or so. Thereby the superiority or inferiority in the performances is measured without distinction between the internal volume in the chassis of the storage apparatus 10 and the external volume of the external storage apparatus 400 connected outside to relocate volumes.

The configuration of the storage apparatus 10 in this embodiment is the same as that in the first embodiment. In addition, the operation of each section is also the same as in the first embodiment except for the measurement of the superiority or inferiority in the performances for each volume on relocating volumes.

<Operation on Volume Relocation>

In this embodiment, the host 300 uses the logical device (LDEV X) 220 on which volumes are mapped by RAID groups 210 in the storage apparatus 10. As the logical volume that is a candidate for the destination thereof is used the logical device (LDEV Y) 420 on which volumes are mapped by the physical storage device 403 of the external storage apparatus 400.

On receipt of read request from the host 300 to the logical device (LDEV X) 220, a read request is internally issued also to the logical device (LDEV Y) 420 that is a candidate for a destination of the logical device (LDEV X) 220.

Each disk control processor 102 measures times from the receipt of the read request to response irrespective of the internal volume in the chassis of the storage apparatus 10 and the external volume of the external storage apparatus 400 connected outside. At that point, data volume requested, frequency of commands received, as well as processing time are recorded.

When data are accumulated in a given time, the superiority or inferiority in the performances is measured based on these data to relocate volumes. Using the accumulated data users can set preferential items such as the uniformity of response time, data volume, and command.

<Operation of Data Collection>

Figure 5:
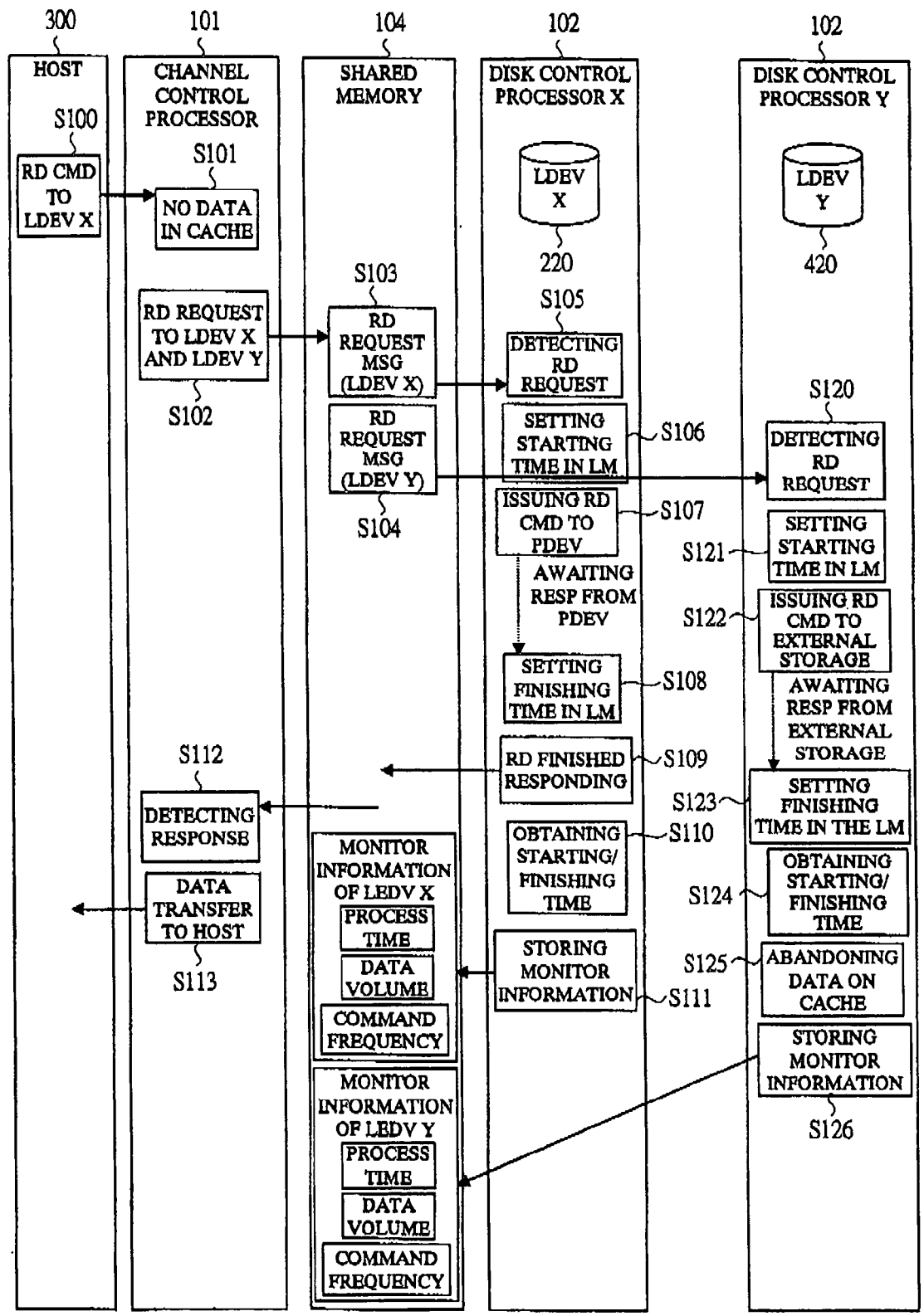
FIG. 5 shows a flow of data-collecting process for collecting data in a storage apparatus related to a second embodiment of the present invention.

The operation of data collection in the second embodiment of the present invention is described with reference to FIG. 5. FIG. 5 shows a flow of data-collecting process for collecting data in the storage apparatus related to the second embodiment of the present invention.

The host 300 generates a read command to the logical device (LDEV X) 220 in the chassis of the storage apparatus 10, and the read command is transmitted to the channel control processor 101 (S100).

The channel control processor 101 receives the read command transmitted from the host 300, and confirms whether there is no data corresponding to the read command in the cache memory 103 (S101).

When having confirmed that there is no data corresponding to the read command in the cache memory 103, the channel control processor 101 executes read request to the logical device (LDEV X) 220 and the logical device (LDEV Y) 420 (S102), and stores in the shared memory 104 a read request message to the logical device (LDEV X) 220 (S103) and a read request message to the logical device (LDEV Y) 420 (S104).

When there is data corresponding to the read command in the cache memory 103 in S101, i.e., a cache hit occurs, not a moving process is executed to exclude them from the collection of the target data, but a common process is executed to the normal logical device (LDEV X) 220.

The disk control processor 102 connected to the storage unit 200 detects the read request to the logical device (LDEV X) 220 in the shared memory 104 (S105), sets a starting time in the local memory in the disk control processor 102 (S106), and issues the read command to the physical storage device 201 (S107).

The disk control processor 102 waits for response from the physical storage device 201. When the physical storage device 201 responds, the disk control processor 102 sets a finishing time in the local memory in the disk control processor 102 (S108), and responds to the channel control processor 101 via the shared memory 104 that read is finished (S109).

Then, the disk control processor 102 obtains a processing time from the starting and the finishing time set in the local memory (S110) and stores in the shared memory 104 such monitor information of the logical device (LDEV X) 220 as processing time, data volume, and command frequency (S111).

The channel control processor 101 detects response from the disk control processor 102 (S112), and transfers data to the host 300 (S113).

The disk control processor 102 connected to the external storage apparatus 400 detects the read request to the logical device (LDEV Y) 420 in the shared memory 104 (S120), sets a starting time in the local memory in the disk control processor 102 (S121), and issues the read command to the external storage apparatus 400 (S122).

The disk control processor 102 waits for response from the external storage apparatus 400. When the external storage apparatus 400 responds, the disk control processor 102 sets a finishing time in the local memory in the disk control processor 102 (S123), obtains a processing time from the starting and the finishing time set in the local memory (S124), abandons the data on the cache memory 103 because these data are intended for data-collection purpose only (S125), and stores in the shared memory 104 such monitor information of the logical device (LDEV Y) 420 as processing time, data volume, and command frequency (S126).

Through the above process, in the shared memory 104 are stored the monitor information on read command from the host 300 to the logical device (LDEV X) 220 and the monitor information on read command to the logical device (LDEV Y) 420 with the same address as the read command to the logical device (LDEV X) 220. Referring to the monitor information of the logical device (LDEV X) 220 and the logical device (LDEV Y) 420 enables the confirmation of performances of the logical device (LDEV X) 220 and the logical device (LDEV Y) 420.

<Relocation of Volumes>

In the following is described the operation of volume relocation between a logical device before relocated and a candidate logical device after relocated in a storage apparatus related to the second embodiment of the present invention with reference to FIG. 6. FIG. 6 is a diagram for describing the operation of volume relocation between a logical device before relocated and a candidate logical device after relocated in a storage apparatus related to the second embodiment of the present invention. It also shows a schematic diagram with parts omitted except for the logical device (LDEV X) 220, the logical device (LDEV Y) 420, the RAID group 210, the physical storage device 201, the logical volume (host LU) 410 and the physical storage device 403.

In an ordinary state the logical device (LDEV X) 220 is mapped onto the RAID groups 210 in the storage unit 200 of the logical volume 10 or in the RAID groups 210. The logical device (LDEV Y) 420 is mapped onto the logical volumes (host LU) 410 in the external storage apparatus 400 (S200).

The same address, for example, is accessed based on monitor information of the logical device (LDEV X) 220 and logical device (LDEV Y) 420 accumulated in a given time by the data collection shown in FIG. 5. If the logical device (LDEV Y) 420 is superior in performance to the logical device (LDEV X) 220, data is moved from the logical device (LDEV X) 220 to the logical device (LDEV Y) 420 that is a candidate for destination (S201). Then, mapping of respective logical devices is changed (S202). The host 300 relocates volumes so that the logical volumes in the external storage apparatus 400 can be used.

Thus, in this embodiment, a read request with the same address that is used for the read request to the logical device (LDEV X) 220 before relocation is generated internally for the logical device (LDEV Y) 420 of a candidate for relocation. Subsequently, process time, data volume, and command frequency of the logical device (LDEV X) 220 before relocation and the logical device (LDEV Y) 420 of a candidate for relocation are accumulated to measure the superiority or inferiority in the performances of the logical device.

I/O of read request issued to the internal volume in the chassis of the storage apparatus 10 and the external volume of the external storage apparatus 400 connected outside are indistinguishable at the internal and the external volume. Hence, the superiority or inferiority in the performances of the logical device can be measured based on a uniformed criterion, enabling optimum volume relocation.

<Determination of Volume Relocation>

In the above is described an example of volume relocation between the logical device (LDEV X) 220 before relocation and the logical device (LDEV Y) 420 of a candidate for relocation. However, the volume relocation of the storage apparatus 10 in its entirety may also be determined by measuring performances of the RAID groups 210 to which each logical volume belongs and the physical storage devices 403 based upon the monitor information collected at the data collection process in FIG. 5.

With reference to FIG. 7 is described how the volume relocation is determined in the storage apparatus related to the second embodiment of the present invention. FIG. 7 is a flow chart showing the operation of determination to relocate volumes in the storage apparatus related to the second embodiment of the present invention.

Firstly, the RAID groups 210 and the external storage apparatus 400 to which each logical volume belongs are acquired (S300), in order to acquire a target period for determining relocation (S301).

The monitor information of each logical device in the target period is acquired and aggregated for each RAID group 210 and external storage apparatus 400 (S302).

An upper threshold of each information (process time, data volume, and command frequency) on predetermined monitor information is acquired (S303). Then, if the monitor information aggregated at S302 is greater than the threshold acquired at S303, it is determined that the logical area corresponding to the RAID groups 210 and the external storage apparatus 400 needs relocation (S304).

At the step (S305) is acquired and aggregated the rate of utilizing a disk device at the logical area corresponding to each physical area of the RAID groups 210 and the external storage apparatus 400 that are judged necessary to be relocated at S304. Higher rate of utilizing the disk device is selected as the logical area for relocation (S306). For the selection of the logical area, monitor information of the selected logical area is deducted from monitor information of RAID groups 210 until the latter becomes smaller than its threshold (S307). The logical area with higher utilization rate at the disk device is considered to be influential to the utilization rate of the RAID groups 210, and more frequent in access from the host 300 to the logical area. Therefore preferentially locating the logical area with higher utilization rate at the disk device can bring about expectations of an effective improvement in performances of the storage apparatus 10.

Then, search is made for the physical area to be relocated for the selected physical area. For example, an area that is superior in performance and unused is acquired by monitor information (S308).

A predicted value of the monitor information of the RAID groups 210 is obtained in case of letting each unused physical area be a relocated area (S309). Among unused physical areas is selected an unused physical area that is unlikely to exceed the upper value of the threshold of the monitor information when they are let be relocated area, as the physical area to be relocated (S310).

With the physical area for the relocated one, for example, if the monitor information of the external storage apparatus 400 is superior in performance, the external storage apparatus 400 is selected as the relocated area.

The result selected at S310 is output as, for example, relocation information (S311). Selection of relocation physical areas from among all selected physical areas has been finished, then, the process is ended (S312).

By the above process is determined volume relocation, and volumes are relocated so that the total processing capacity of the storage apparatus 10 including the external storage apparatus 400 is maximized.

The volume relocation may be determined by prioritizing the threshold of the preferential items while setting the preferential items specified when volume relocation is determined by users such as the uniformity of response time, data volume, and command by each information of monitor information (process time, data volume, and command frequency).

If there is application-prioritized volume when volume relocation is determined, that volume is handled as non-target relocation volume, and excluded from the target of volume relocation based on measurements of access concentration, as a result, the volume relocation is not carried out.

As describe above, in the embodiment, I/O is issued internally to the internal volume of the storage apparatus 10 and the external volume of the external storage apparatus 400 connected outside to measure its response time. Thereby, the superiority or inferiority in the performances can be measured without distinction between the internal volume in the chassis of the storage apparatus 10 and the external volume of the external storage apparatus 400 connected outside to relocate volumes. That makes it possible to relocate volumes accurately and precisely to the external storage apparatus 400 connected outside to the storage apparatus 10.

The present invention made by the inventors have been described above in detail based upon the embodiments. The present invention is not limited to the embodiments, and it is to be understood that the embodiments can be changed without departing from the scope and spirit of the present invention.

For example, in the first and the second embodiment are described samples in which the external storage apparatus 400 is connected to the disk control processor 102. However, the external storage apparatus 400 may be connected to the channel control processor 101. In that case, the operation is the same as is the case with the external storage apparatus 400 being connected to the disk control processor 102 except for the external storage apparatus 400 being controlled by the channel control processor 101.

If the storage apparatus 10 controls the host 300, storage unit 200, and the external storage apparatus 400 through a control section incorporating the channel control processor 101 and the disk control processor 102, it is advisable to control all controlling processes including data collection by the control section.

In the following are briefly described the effects obtained by the typical inventions among those disclosed in this application.

According to the present invention, volumes can be relocated precisely by the same measurement as is used in measuring the physical storage device in the chassis of the storage apparatus without discriminating between the internal volume in the chassis of the storage apparatus and the external volume of the external storage apparatus connected outside.

According to the present invention, I/O is issued internally to the internal volume of the storage apparatus and the external volume of the external storage apparatus connected outside to measure its response time. Thereby, the superiority or inferiority in the performances is measured without discriminating between the internal volume in the chassis of the storage apparatus and the external volume of the external storage apparatus connected outside to relocate volumes. That makes it possible to relocate volumes accurately and precisely to the external storage apparatus connected outside to the storage apparatus.

What is claimed is:

1. A storage apparatus having a storage control device and a storage unit comprised of a plurality of physical storage devices, wherein the storage control device comprising:
    a control section for communicating with a host apparatus and the storage unit;
    a cache memory for storing temporarily data transferred between the host apparatus and the storage unit; and
    a shared memory in which control information communicated by the control section is stored,
    wherein the storage control device defines a logical device of an external storage unit set on a plurality of physical storage devices in at least one external storage apparatus each of which has an I/O processor and is connected outside a chassis of the storage apparatus as a logical device inside the storage apparatus,
    the storage control device maps a plurality of logical volumes of at least one RAID group accessible by the host apparatus to said logical device of an external storage unit,
    the storage control device relocates said logical volumes of at least one RAID group by moving data per logical device from one mapped logical device to a to-be-mapped logical device with a superior performance and re-mapping said logical volumes of at least one RAID group from said mapped logical device to said to-be-mapped logical device, and at least one of the mapped and to-be-mapped logical devices is said logical device of an external storage unit,
    the storage control device virtualizes the logical device of the external storage unit along with a logical device set on the plurality of physical storage devices in the storage apparatus, and provides the virtualized logical volume to the host apparatus,
    the storage control device issues I/O commands to both said logical device physically located therein and the logical device of the external storage unit, measures respective I/O occupied times based on a corresponding response time thereof, determines if the to-be-mapped logical device has a performance superior to the mapped logical device to trigger relocation, and determines whether the logical device therein or the logical device of the external storage unit is a relocation destination, if the to-be-mapped logical device has a performance superior to the mapped logical device, and
    if the logical device of the external storage unit is determined as the relocation destination, the storage control device virtualizes the logical device of the relocation destination and provides the virtualized logical device to the host apparatus.

2. The storage apparatus according to claim 1, wherein the volumes prioritized by application on the host apparatus are not relocated by the volume relocation function by treating them as non-target volume for relocation.

3. The storage control device according to claim 1, wherein the control section comprises a plurality of channel control processors for communicating with the host apparatus and a plurality of disk control processors for communicating with the storage unit.

4. The storage apparatus according to claim 3, wherein the external storage apparatus is connected to the channel control processor, or the disk control processor.

5. The storage apparatus according to claim 1, wherein the external storage apparatus further includes a channel port for communicating with the storage apparatus.

6. The storage apparatus according to claim 5, wherein the channel port is assigned with a World Wide Name (WWN).

7. The storage apparatus according to claim 1, wherein a plurality of said external storage apparatus connected outside the chassis of the storage apparatus, and the external connection function defines one logical volume of a plurality of external storage units set on a corresponding physical storage device in a corresponding one of the external storage apparatus as one logical volume inside the storage apparatus.

8. The storage apparatus according to claim 1, wherein the storage control device relocates a logical volume by moving data corresponding to the logical volume from a first RAID group mapped with a first logical device to a second RAID group mapped with a second logical device which is less frequently accessed and re-mapping said logical volume from said first RAID group to said second RAID group.

9. The storage apparatus according to claim 8, wherein the data is moved to a reserved logical volume of the second RAID group, which was not assessable by the host apparatus.

10. A storage apparatus having a storage control device and a storage unit comprised of a plurality of physical storage devices, wherein the storage control device comprising:
   a control section for communicating with a host apparatus and the storage unit;
   a cache memory for storing temporarily data transferred between the host apparatus and the storage unit; and
   a shared memory in which control information communicated by the control section is stored,
   wherein the storage control device defines a logical device of an external storage unit set on a plurality of physical storage devices in at least one external storage apparatus each of which has an I/O processor and is connected outside a chassis of the storage apparatus as a logical device inside the storage apparatus,
   the storage control device maps a plurality of logical volumes of at least one RAID group accessible by the host apparatus to said logical device of an external storage unit,
   the storage control device relocates said logical volumes of at least one RAID group by moving data per logical device from one mapped logical device to a to-be-mapped logical device with a superior performance and re-mapping said logical volumes of at least one RAID group from said mapped logical device to said to-be-mapped logical device, and at least one of the mapped and to-be-mapped logical devices is said logical device of an external storage unit,
   the storage control device virtualizes the logical device of the external storage unit along with a logical device set on the plurality of physical storage devices in the storage apparatus, and provides the virtualized logical volume to the host apparatus,
   the storage control device issues I/O commands to both said logical device physically located therein and the logical device of the external storage unit, measures respective I/O occupied times based on a corresponding response time thereof, determines if the to-be-mapped logical device has a performance superior to the mapped logical device to trigger relocation, and determines whether the logical device therein or the logical device of the external storage unit is a relocation destination, if the to-be-mapped logical device has a performance superior to the mapped logical device,
   if the logical device of the external storage unit is determined as the relocation destination, the storage control device virtualizes the logical device of the relocation destination and provides the virtualized logical device to the host apparatus, and
   when the host apparatus sends a read request to the logical device therein, the volume relocation function generates internally the same read request to the logical device of the external storage unit and relocates logical devices based on a monitor information obtained by monitoring response times to the read request.

11. The storage apparatus according to claim 10, wherein the volumes prioritized by application on the host apparatus are not relocated by the volume relocation function by treating them as non-target volume for relocation.

12. The storage apparatus according to claim 10, wherein the monitor information includes data volume, and command frequency.

13. The storage control device according to claim 10, wherein the control section comprises a plurality of channel control processors for communicating with the host apparatus and a plurality of disk control processors for communicating with the storage unit.

14. The storage apparatus according to claim 13, wherein the external storage apparatus is connected to the channel control processor, or the disk control processor.

15. The storage apparatus according to claim 13, wherein the monitor information includes data volume, and command frequency.

16. A storage apparatus having a storage control device and a storage unit comprised of a plurality of physical storage devices, wherein the storage control device comprises:
   a data transfer control section for controlling data transfer between a host apparatus and itself and between the storage unit and itself;
   a cache memory for storing temporarily the data;
   a shared memory in which configuration information of the storage apparatus is stored,
   wherein the storage control device defines a logical device of an external storage unit set on a plurality of physical storage devices in at least one external storage apparatus each of which has an I/O processor and is connected outside a chassis of the storage apparatus as a logical device inside the storage apparatus,
   the storage control device maps a plurality of logical volumes of at least one RAID group accessible by the host apparatus to said logical device of an external storage unit,
   the storage control device relocates said logical volumes of at least one RAID group by moving data per logical device from one mapped logical device to a to-be-mapped logical device with a superior performance and re-mapping said logical volumes of at least one RAID group from said mapped logical device to said to-be-mapped logical device, and at least one of the mapped and to-be-mapped logical devices is said logical device of an external storage unit,
   the storage control device virtualizes the logical device of the external storage unit along with a logical device set on the plurality of physical storage devices in the storage apparatus, and provides the virtualized logical volume to the host apparatus,
   the storage control device issues I/O commands to both said logical device physically located therein and the logical device of the external storage unit, measures respective I/O occupied times based on a corresponding response time thereof, determines if the to-be-mapped logical device has a performance superior to the mapped logical device to trigger relocation, and determines whether the logical device therein or the logical device of the external storage unit is a relocation destination, if the to-be-mapped logical device has a performance superior to the mapped logical device,
   if the logical device of the external storage unit is determined as the relocation destination, the storage control device virtualizes the logical device of the relocation destination and provides the virtualized logical device to the host apparatus, and the storage control device issues a read request to the logical device of the external storage unit to measure the response time.

17. A method for relocating volumes of a storage apparatus which comprises a storage control device having a plurality of channel control processors for controlling data transfer between a host apparatus and itself, a disk control processor for controlling data transfer between a storage unit and itself, a cache memory for storing temporarily the data, and a shared memory in which configuration information of the storage apparatus is stored, the method comprising:

defining a logical device of an external storage unit set on a plurality of physical storage devices in at least one external storage apparatus each of which has an I/O processor and is connected outside a chassis of the storage apparatus as a logical device inside the storage apparatus;

mapping a plurality of logical volumes of at least one RAID group accessible by the host apparatus to said logical device of an external storage unit;

virtualizing the logical device of the external storage unit and provides the virtualized logical device to the host apparatus;

when the host apparatus sends a read request to the logical device physically located therein, generating internally the same read request to the logical device of the external storage unit;

issuing the read request to the logical device of the external storage unit;

measuring a response time to the read request of I/O by the logical device of the external storage unit and a response time to the read request of I/O by the logical device in the storage apparatus;

determining whether there is a to-be-mapped logical device with a faster response time to the read request than a mapped logical device mapped with logical volumes of at least one RAID group, and at least one of the mapped and to-be-mapped logical devices being said logical device of an external storage unit;

relocating the logical volume s of at least one RAID group by moving data per logical device from one mapped logical device to a to-be-mapped logical device, if there is a to-be-mapped logical device with a faster response time to the read request than said mapped logical device; and if the logical device of the external storage unit is determined as the relocation destination, virtualizing the logical device of the relocation destination and providing the virtualized logical device to the host apparatus.

* * * * *